(12) United States Patent
Hara et al.

(10) Patent No.: US 8,659,807 B2
(45) Date of Patent: Feb. 25, 2014

(54) IMAGE READING APPARATUS

(75) Inventors: Koji Hara, Shiojiri (JP); Tetsuya Miyagawa, Shiojiri (JP); Naomi Kimura, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 320 days.

(21) Appl. No.: 13/238,274

(22) Filed: Sep. 21, 2011

(65) Prior Publication Data
US 2012/0086991 A1    Apr. 12, 2012

(30) Foreign Application Priority Data

Oct. 8, 2010   (JP) ................................. 2010-228181

(51) Int. Cl.
*H04N 1/04*         (2006.01)
(52) U.S. Cl.
USPC ............ 358/497; 358/474; 358/494; 358/471
(58) Field of Classification Search
None
See application file for complete search history.

(56) References Cited

U.S. PATENT DOCUMENTS

| | | | | |
|---|---|---|---|---|
| 5,999,277 A * | 12/1999 | Tsai | ............................. | 358/498 |
| 6,771,399 B1 * | 8/2004 | Batten | ........................... | 358/497 |
| 6,888,651 B2 * | 5/2005 | Lee | .............................. | 358/497 |
| 7,126,728 B2 * | 10/2006 | Tseng et al. | .................. | 358/497 |
| 7,154,643 B2 * | 12/2006 | Chang et al. | .................. | 358/497 |
| 7,161,717 B2 * | 1/2007 | Lee | .............................. | 358/497 |
| 7,768,679 B2 * | 8/2010 | Yamaguchi | .................. | 358/497 |
| 8,081,356 B2 * | 12/2011 | Yamauchi | ..................... | 358/497 |
| 2004/0012823 A1 | 1/2004 | Hendrix et al. | | |
| 2009/0190190 A1 | 7/2009 | Yamauchi | | |
| 2012/0086967 A1 * | 4/2012 | Hara et al. | ..................... | 358/1.13 |
| 2012/0086988 A1 * | 4/2012 | Hara et al. | ..................... | 358/296 |
| 2012/0120461 A1 * | 5/2012 | Oshima et al. | ................ | 358/474 |
| 2013/0188001 A1 * | 7/2013 | Kimura et al. | ................ | 347/108 |

FOREIGN PATENT DOCUMENTS

| | | |
|---|---|---|
| JP | 2004-054283 | 2/2004 |
| JP | 2009-205134 A | 9/2009 |
| JP | 2009-253327 A | 10/2009 |

* cited by examiner

*Primary Examiner* — Cheukfan Lee
(74) *Attorney, Agent, or Firm* — Workman Nydegger (57) ABSTRACT

An image reading apparatus comprises: a guide portion that is linked to a driving portion and extends so as to guide the movement of a reading carriage; a guide rail that guides the reading carriage while supporting the reading carriage; and an interlocking portion that is provided in the reading carriage, has a first sliding surface that makes contact with the guide rail on the side of the guide rail facing the guide portion and a second sliding surface that makes contact with the guide rail on the side of the guide rail that is on the opposite side as the guide portion. The position at which the first sliding surface of the interlocking portion makes contact with the guide rail is lower on the guide rail than the position at which the second sliding surface of the interlocking portion makes contact with the guide rail.

5 Claims, 5 Drawing Sheets

IMAGE READING APPARATUS

BACKGROUND

1. Technical Field

The present invention relates to image reading apparatuses such as flatbed scanners.

2. Related Art

Thus far, there have been scanners, which are a type of image reading apparatus, in which a carriage that moves in the main scanning direction supports a reading sensor for reading an image of a document, and a motor for moving the carriage is provided in the scanner (for example, see JP-A-2004-54283).

In the scanner disclosed in JP-A-2004-54283, a pinion that is rotated by the motor is mounted in the carriage, and a rack that engages with the pinion is provided in the main apparatus unit itself. Accordingly, the carriage moves in the main scanning direction as a result of the motor being driven when the pinion and the rack are engaged with each other.

Incidentally, with such a carriage, there are cases where the pinion separates from the rack while the pinion is rotating. Accordingly, with the scanner disclosed in JP-A-2004-54283, the pinion is suppressed from separating from the rack by causing a guide member that is provided in the carriage to make contact with the rear surface of the toothed face of the rack.

However, in this case, momentum is generated central to the point of engagement between the pinion and the rack, and there is thus a problem in that areas at both ends in the lengthwise direction of the carriage, which is orthogonal to the main scanning direction, will become tilted. As a result, the reading sensor will also become tilted when the carriage is moving, resulting in the risk of images being read in a tilted state.

SUMMARY

An advantage of some aspects of the invention is to provide an image reading apparatus capable of suppressing tilting in a reading sensor supported by a carriage.

An image reading apparatus according to an aspect of the invention includes: a reading sensor for reading an image; a reading carriage that supports the reading sensor; a driving portion that moves the reading carriage; a guide portion that is linked to the driving portion and that extends so as to guide the movement of the reading carriage; a guide rail, extending parallel to the guide portion, that guides the reading carriage while supporting the reading carriage; and an interlocking portion, provided in the reading carriage, having a first sliding surface that makes contact with the guide rail on the side of the guide rail facing the guide portion and a second sliding surface that makes contact with the guide rail on the side of the guide rail that is on the opposite side as the guide portion. Here, the position at which the first sliding surface of the interlocking portion makes contact with the guide rail is further on the downward side of the guide rail than the position at which the second sliding surface of the interlocking portion makes contact with the guide rail.

Furthermore, an image reading apparatus according to another aspect of the invention includes: a reading sensor for reading an image; a reading carriage that supports the reading sensor and moves in the main scanning direction; a guide portion that extends in the main scanning direction for guiding the movement of the reading carriage; and a guide rail, shaped so as to protrude, that extends in the main scanning direction so as to be arranged with the guide portion in the lengthwise direction of the reading carriage that intersects with the main scanning direction and guides the reading carriage while supporting the reading carriage. Here, a rotational member that makes contact with the guide portion and rotates, and an interlocking recess portion that interlocks with the guide rail, are provided in the reading carriage; a first support surface that extends downward in the lengthwise direction from a tip portion of the guide rail toward the guide portion, and a second support surface that extends downward in the lengthwise direction from the tip portion away from the guide portion, are formed in the guide rail; a first sliding surface that interlocks with the first support surface and a second sliding surface that interlocks with the second support surface are formed in the interlocking recess portion of the reading carriage so as to be arranged in the lengthwise direction; and an angle of slope that corresponds to the rising angle from the horizontal plane is greater in the first sliding surface than in the second sliding surface.

According to this configuration, because an interlocking recess portion provided in the reading carriage interlocks with the guide rail, tilting of the reading carriage at both ends thereof in the lengthwise direction can be suppressed. In addition, because the first sliding surface that interlocks with the first support surface of the guide rail has a greater angle of slope than the second sliding surface, it is possible to suppress the interlocking recess portion of the reading carriage from riding up on the guide rail. Accordingly, tilting of the reading carriage at both ends thereof in the lengthwise direction when the reading carriage is moving can be suppressed, and it is thus possible to suppress tilting of the reading sensor that is supported by the reading carriage.

In an image reading apparatus according to another aspect of the invention, the support surface and the second support surface are configured of curved surfaces that have the same curvature factor; and when the guide rail and the interlocking recess portion are in an interlocked state, the first sliding surface makes contact with the support surface at a position that is lower than a position at which the second sliding surface makes contact with the second support surface.

According to this configuration, because the first support surface and the second support surface are configured of curved surfaces that have the same curvature factor, the first sliding surface and the second sliding surface can guide without any looseness even in the case where the angle of interlocking between the guide rail and the interlocking recess portion has become shifted. Because the first sliding surface makes contact with the first support surface at a position that is lower than the position at which the second sliding surface makes contact with the second support surface, it is possible to suppress the interlocking recess portion of the reading carriage from riding up on the guide rail.

In an image reading apparatus according to another aspect of the invention, ribs, which form pairs in the lengthwise direction, are provided in the interlocking recess portion so as to oppose each other with the guide rail therebetween, extending downward so as to form a plurality of groups in the main scanning direction; and the first sliding surface and the second sliding surface are formed in the respective ribs that form a pair.

According to this configuration, the sliding load between the interlocking recess portion and the guide rail can be suppressed by the first sliding surface and the second sliding surface, in which the pairs of ribs are formed, interlocking with the guide rail. Furthermore, because a plurality of groups of the pairs of ribs are provided in the main scanning direction, the guide rail can support the reading carriage through the interlocking recess portion in a well-balanced manner.

An image reading apparatus according to another aspect of the invention further includes a driving power source provided in the reading carriage; the rotational member is a pinion that rotates in accordance with the driving of the driving power source; and the guide portion is a rack portion that engages with the pinion.

According to this configuration, the interlocking recess portion of the reading carriage can be suppressed from riding up onto the guide rail by the first sliding surface, whose angle of slope is greater, even in the case where the pinion rotates while engaging with the rack portion.

In an image reading apparatus according to another aspect of the invention, the rotational member is disposed in a position that is between the guide portion and the guide rail in the lengthwise direction.

According to this configuration, although a momentum acting in the direction in which the first sliding surface rides up on the first support surface is generated when the rotational member rotates, the interlocking recess portion of the reading carriage can be suppressed from riding up onto the guide rail by the first sliding surface, whose angle of slope is greater.

BRIEF DESCRIPTION OF THE DRAWINGS

The invention will be described with reference to the accompanying drawings, wherein like numbers reference like elements.

DESCRIPTION OF EXEMPLARY EMBODIMENTS

A complex machine provided with an image reading unit, embodying the image reading apparatus according to the invention, will be described hereinafter. Note that the terms "depth direction", "horizontal direction", and "vertical direction" as used in the descriptions hereinafter refer respectively to the depth direction, horizontal direction, and vertical direction indicated by the arrows in the drawings. Furthermore, with respect to the arrows in the drawings that indicate the top, right, and front directions, a dot within a circle indicates an arrow moving from the rear to the front in the depth direction of the paper itself (in a drawing in which the tip of the arrow is viewed from the front), whereas an × within a circle indicates an arrow moving from the front to the rear in the depth direction of the paper itself (in a drawing in which the base (feather) of the arrow is viewed from the rear).

Figure 1:
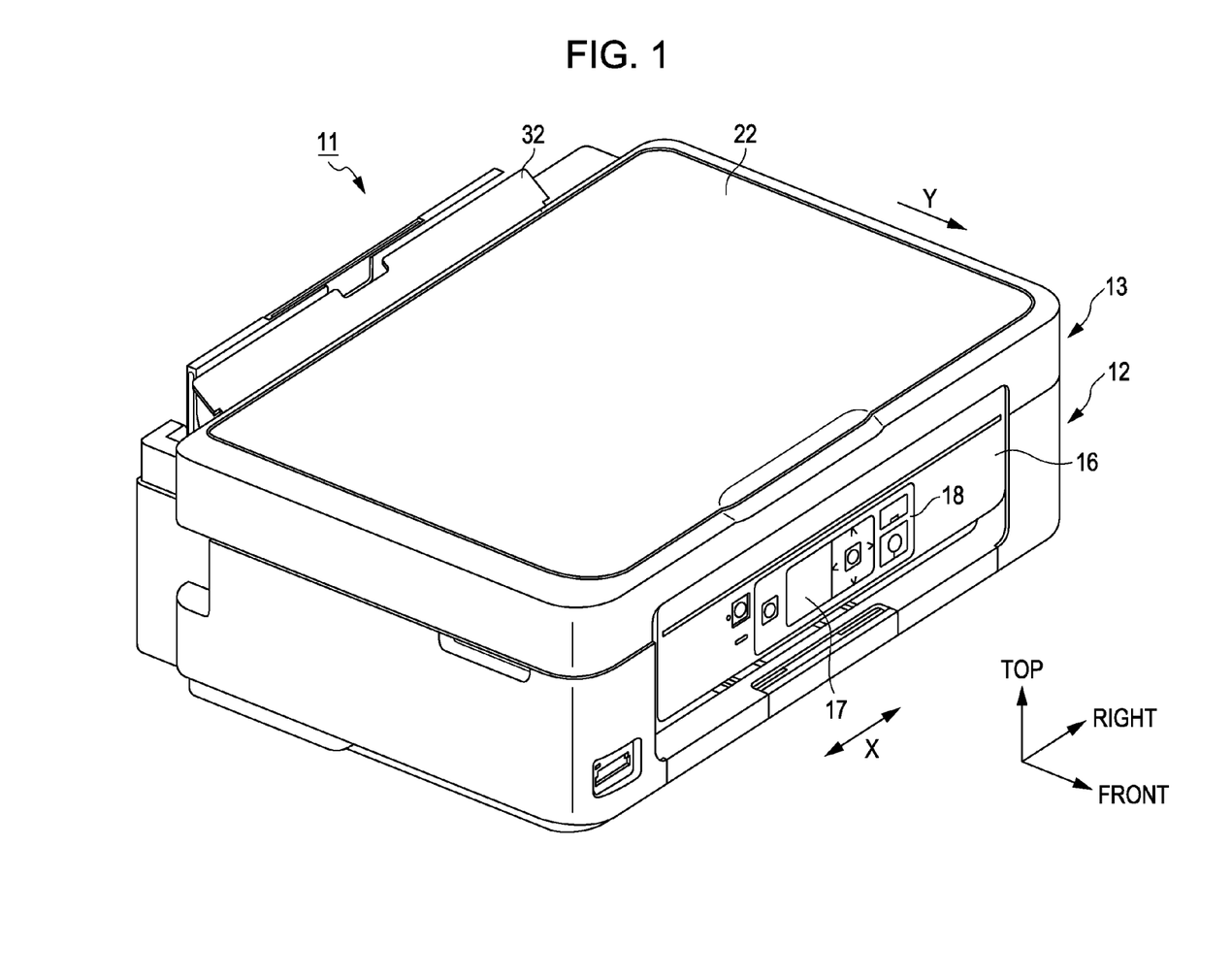
FIG. 1 is a perspective view illustrating the external appearance of a complex machine provided with an image reading unit, embodying the image reading apparatus according to the invention.
Figure 2:
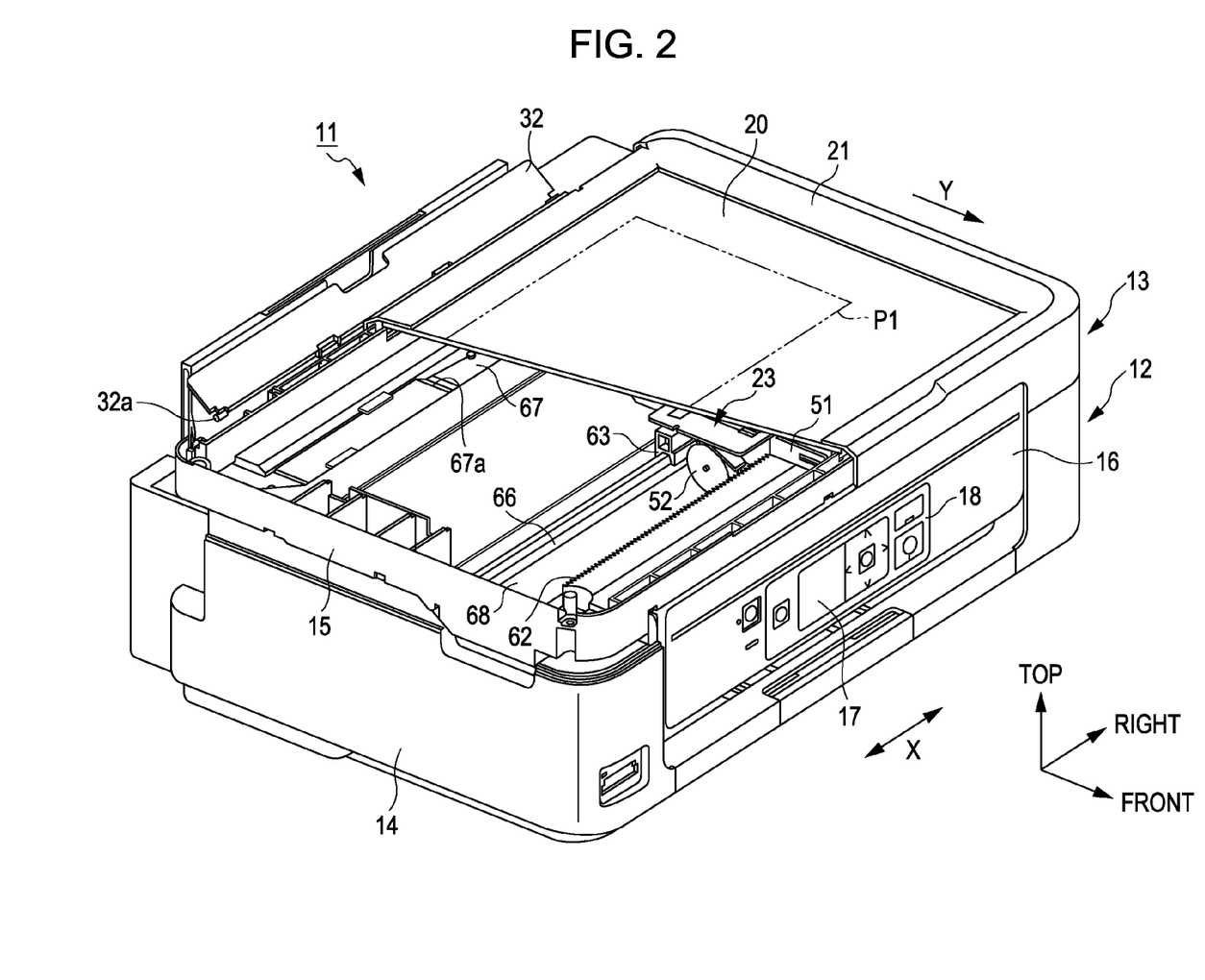
FIG. 2 is a perspective view illustrating an internal area of the image reading unit according to the same embodiment.

As shown in FIG. 1, a complex machine 11 includes a recording unit 12 that functions as a recording apparatus and an image reading unit 13 that functions as an image reading apparatus disposed so as to be arranged in the vertical direction and combined as a single entity. Meanwhile, as shown in FIG. 2, the recording unit 12 includes a recording unit case 14 that configures part of a housing. The image reading unit 13, meanwhile, includes a reading unit case 15, which has a closed-ended box shape, that configures part of the housing. The image reading unit 13 is disposed above the recording unit 12.

An operation panel 16 for operating the recording unit 12 and the image reading unit 13 is provided on the front surface side of the complex machine 11. The operation panel 16 includes a display unit 17 (for example, a liquid-crystal display), disposed in the vicinity of the center in the horizontal direction and used for displaying menu screens and the like, and an operation unit 18 provided on both the right and left sides of the display unit 17.

A document platform 20, configured of a quadrangular plate-shaped piece of transparent glass, is disposed on the top of the reading unit case 15 in the image reading unit 13. In addition, an upper case 21 for anchoring the document platform 20 from above is embedded in the reading unit case 15.

Figure 3:
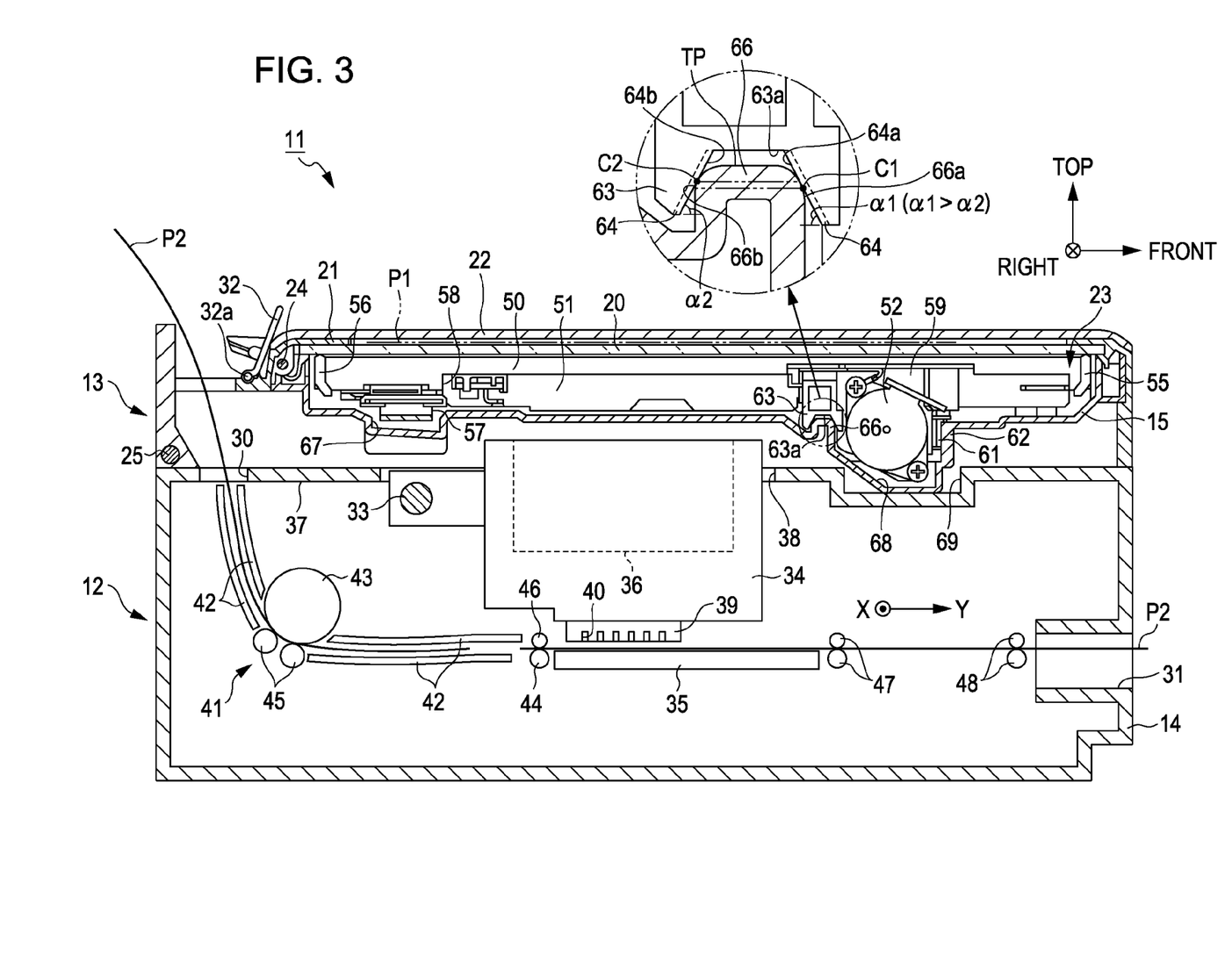
FIG. 3 is a cross-sectional view illustrating the configuration of the complex machine according to the same embodiment.

As shown in FIG. 3, a document cover 22 is provided above the upper case 21 of the image reading unit 13, so as to be capable of being opened and closed. Note that in FIG. 2, the document cover 22 is not shown in order to clearly show the document platform 20 and the like. A scanner unit 23 for reading images (text, graphics, or the like) recorded on a document P1 placed on the upper surface of the document platform 20 is housed within the reading unit case 15, below the document platform 20.

The document cover 22 of the image reading unit 13 is opened and closed by pivoting the document cover 22 central to a cover shaft 24 that is provided toward the rear surface of the document cover 22 and that extends along the main scanning direction X (the horizontal direction, in this embodiment), and the document platform 20 is exposed by opening the document cover 22 so that the front end side thereof separates from the document platform 20. When an image is read by the image reading unit 13, the document P1 is placed on the document platform 20 with the side of the document P1 that is to be read facing downward, and the document cover 22 is closed, which causes the side of the document P1 that is to be read to come into close contact with the document platform 20. Meanwhile, the reading unit case 15 of the image reading unit 13 is opened and closed by pivoting the reading unit case 15 central to a pivot shaft 25 that is provided toward the rear surface of the recording unit case 14 and that extends in the main scanning direction X. The upper surface side of the recording unit case 14 is exposed by opening the reading unit case 15 so that the front end side thereof separates from the recording unit case 14.

Next, the configuration of the recording unit 12 will be described.

An insertion port 30 for inserting paper P2 is provided in the rear surface side of the recording unit case 14. Meanwhile, a discharge port 31 for discharging the paper P2 from the recording unit case 14 is provided in the front surface side of the recording unit case 14. Note that an insertion port cover 32 that can be pivoted central to a shaft portion 32a is provided in the image reading unit 13 above the insertion port 30. When the recording unit 12 is to carry out manual-supply printing, the insertion port cover 32 is opened and the paper P2 is inserted through the insertion port 30, as shown in FIG. 3. However, when the insertion port 30 is not used, the insertion port cover 32 is closed in order to prevent foreign objects and the like from entering into the insertion port 30, as shown in FIG. 1.

As shown in FIG. 3, a guide shaft 33 extending along the horizontal direction (the main scanning direction X) extends between the left and right side walls of the recording unit case 14. A recording carriage 34 is supported on the guide shaft 33, so as to be capable of moving along the main scanning direction X. The recording carriage 34 moves back and forth along the main scanning direction X based on the driving of a carriage motor (not shown). Furthermore, a support member 35 is provided in the recording unit case 14, below the recording carriage 34.

An ink cartridge 36 that holds ink is mounted in the recording carriage 34 in a removable state. Note that when the ink cartridge 36 is to be mounted on and removed from the recording carriage 34, the reading unit case 15 of the image reading unit 13 is opened in order to enable access to the upper surface side of the recording unit case 14. Furthermore, an opening portion 38 for permitting the recording carriage 34 to protrude upward is provided in a ceiling portion 37 of the recording unit case 14.

An ink jet recording head 39 for recording (printing) onto the paper P2 is supported on the lower surface side of the recording carriage 34. Ink supply channels (not shown) for supplying the ink held within the ink cartridge 36 to nozzles 40 provided in the lower surface side of the recording head 39 are formed in the recording carriage 34.

The recording unit 12 includes a feed mechanism 41 for feeding the paper P2 inserted through the insertion port 30 from the upstream side of a transport direction Y (the direction orthogonal to the main scanning direction X), which corresponds to the rear surface side of the recording unit case 14, toward the downstream side, where the recording will be carried out by the recording head 39. The feed mechanism 41 includes: a transport path formation member 42 for guiding the paper P2; feed rollers 43 and 44 that rotate central to rotational shafts (not shown) that extend in the horizontal direction; slave rollers 45 and 46 that form pairs with the feed rollers 43 and 44 respectively; and a transport motor (not shown) for rotating the feed rollers 43 and 44.

Furthermore, a pair of discharge rollers 47 and 48 for discharging the paper P2 onto which recording has been carried out by the recording head 39 is provided downstream from the recording head 39 in the transport direction Y. Note that the pair of discharge rollers 47 and 48 may be rotated by the transport motor (not shown), or may be rotated by a discharge motor (not shown) provided specifically for discharging.

The recording unit 12 carries out the recording onto the paper P2 by ejecting ink from the nozzles 40 of the recording head 39 onto the upper surface of the paper P2 that has been fed by the feed mechanism 41 and is supported by the support member 35. The paper P2 that has been recorded onto is then discharged by the pair of discharge rollers 47 and 48 to the outside of the recording unit case 14 through the discharge port 31.

Next, the configuration of the scanner unit 23 will be described.

The scanner unit 23 includes: a reading sensor 50 for reading images; a reading carriage 51 that supports the reading sensor 50 and moves in the main scanning direction X; and a motor 52, which is an example of a driving power source, that is mounted in the reading carriage 51 and is used to move the reading carriage 51.

Figure 4:
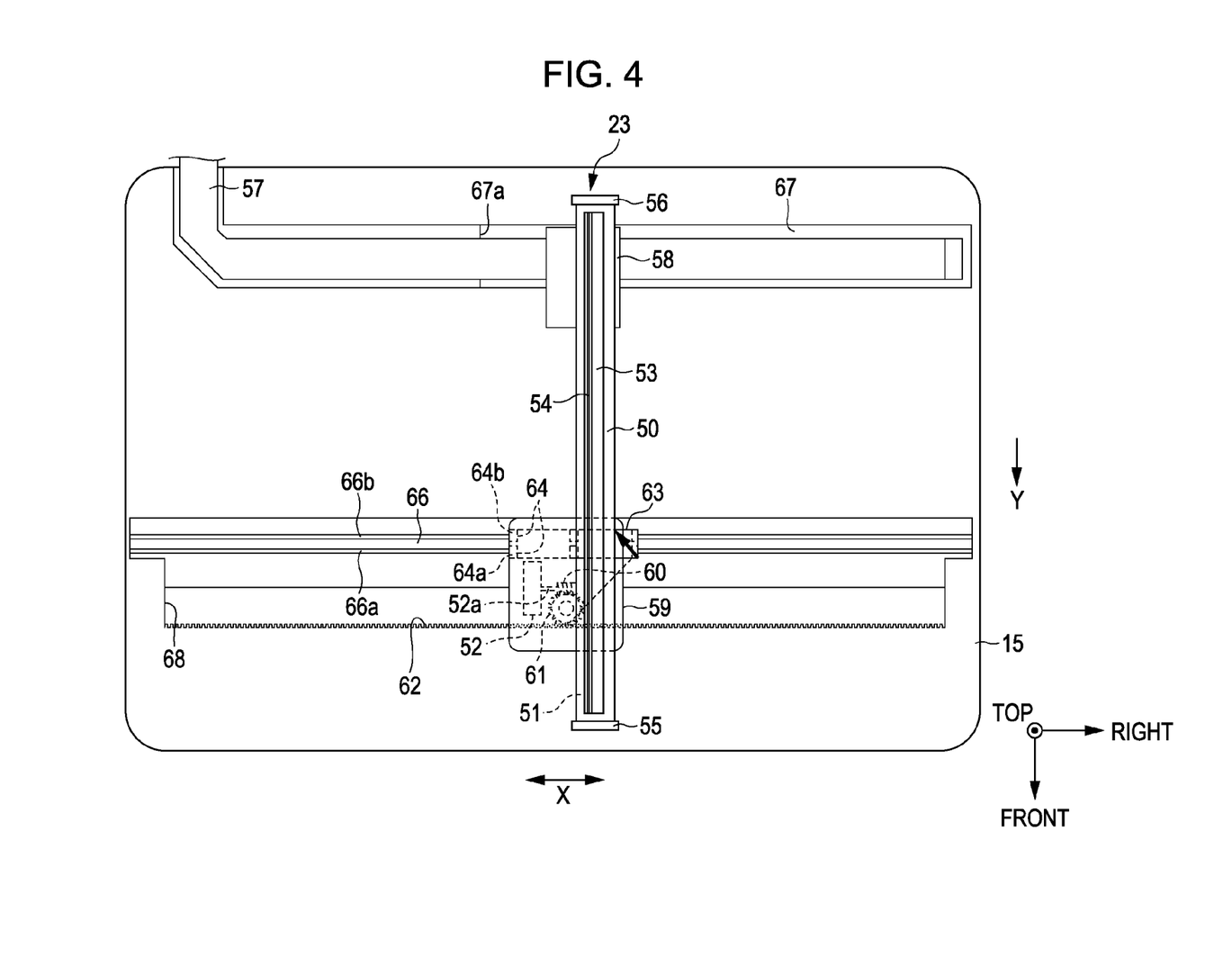
FIG. 4 is a top view illustrating the configuration of the image reading unit according to the same embodiment.
Figure 5:
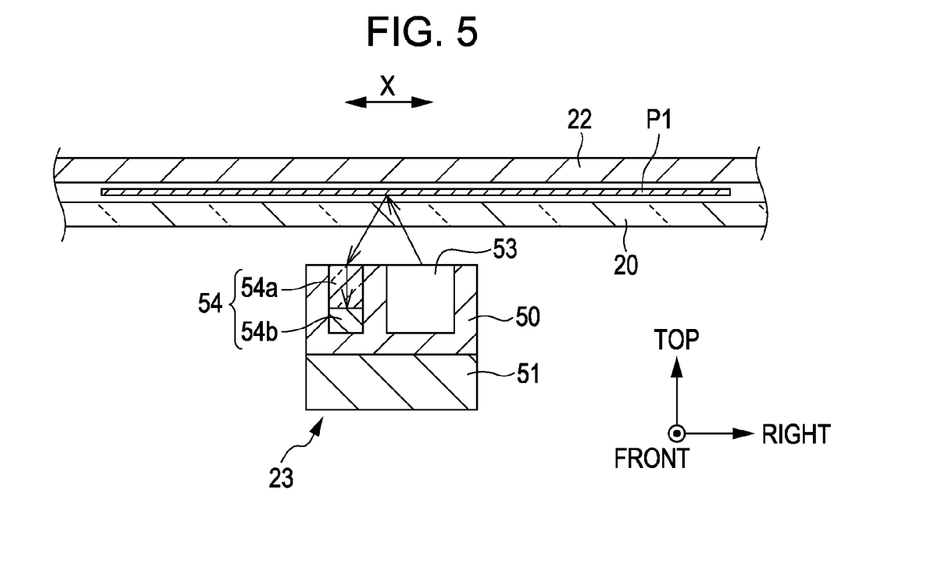
FIG. 5 is a cross-sectional view illustrating effects of a reading sensor according to the same embodiment.

As shown in FIG. 4, the reading sensor 50 includes a light source unit 53 such as an LED (light-emitting diode) and a light-receiving unit 54 that receives reflected light resulting from the light that has been emitted by the light source unit 53. As shown in FIG. 5, the light-receiving unit 54 optically reads text, graphics, and so on recorded on the document P1 by sensing the light emitted from the light source unit 53, and then reflected by the document P1, using a linear sensor 54b, after the light has passed through a rod lens array 54a.

As shown in FIG. 4, the reading sensor 50 and the reading carriage 51 take as their lengthwise direction the transport direction Y, which is orthogonal to the main scanning direction X. Spacers 55 and 56, erected so that the upper ends thereof make contact with the bottom surface of the document platform 20, are attached on both ends (the front end and the back end) in the transport direction Y of the reading carriage 51. While the spacer 55 is disposed downstream from (to the front of) the motor 52 in the transport direction Y, the spacer 56 is disposed upstream from (to the rear of) the recording carriage 34 in the transport direction Y (see FIG. 3).

A flexible cable 57 (a flexible flat cable) that extends from the rear surface side of the recording unit case 14 is connected to the reading carriage 51. The flexible cable 57 is an entity in which a plurality of electric wires and the like are bundled together in a flat shape, and sends control signals from a control unit (not shown) provided in the recording unit case 14 to the motor 52, the reading sensor 50, and the like, sends data obtained through reading from the reading sensor 50 to the control unit (not shown), and so on. The flexible cable 57 is connected to a connection portion 58 provided in a position that is on the upstream side of the reading carriage 51 in the transport direction Y.

The motor 52 is supported by a support portion 59 provided in a position that is on the downstream side of the reading carriage 51 in the transport direction Y. A worm gear 60 that is connected to an output shaft 52a of the motor 52 and a pinion 61 serving as an example of a rotational member that engages with the worm gear 60 and rotates in accordance with the driving of the motor 52 are supported by the support portion 59 of the reading carriage 51. In addition, a rack portion 62, which serves as an example of a guide portion that engages with the pinion 61 from the front and guides the movement of the reading carriage 51, is provided on the downstream side of the reading unit case 15 in the transport direction Y, extending in the main scanning direction X.

Figure 6:
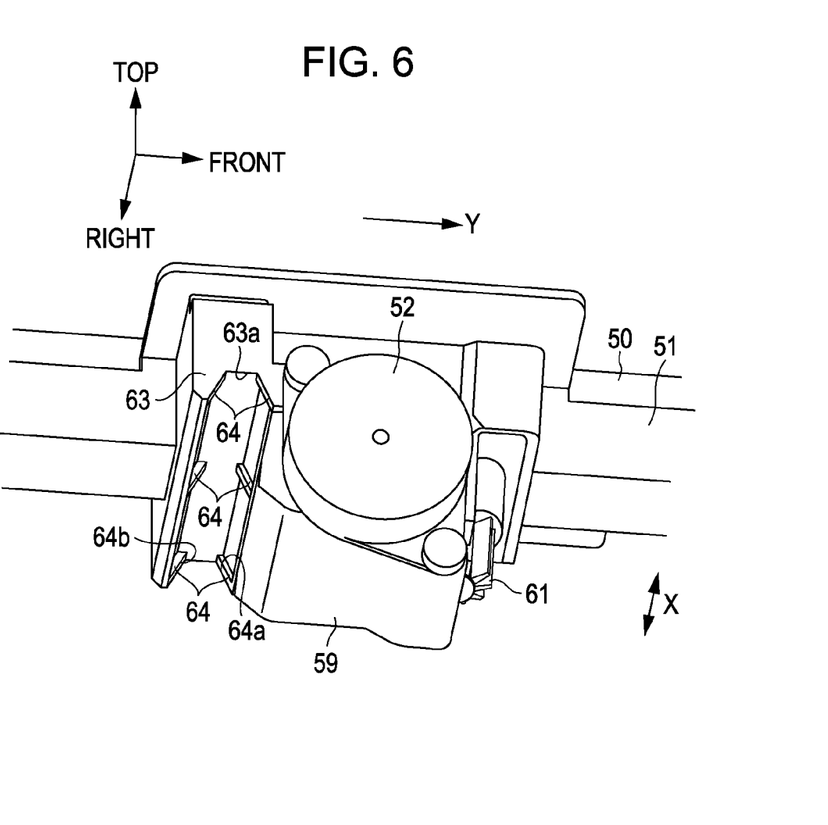
FIG. 6 is a perspective view illustrating ribs extending from a slider provided in a reading carriage according to the same embodiment.

As shown in FIG. 6, a slider 63 that extends in the main scanning direction X is provided behind the motor 52 in the support portion 59. An interlocking recess portion 63a is formed in the lower surface of the slider 63, and a plurality of (in this embodiment, six) ribs 64 protrude from the interlocking recess portion 63a. The ribs 64 are arranged so as to form pairs in the lengthwise direction (the transport direction Y), and protrude downward so as to be arranged in a plurality of groups in the main scanning direction X (in the present embodiment, three groups).

As shown in FIG. 3, a guide rail 66, which extends in the main scanning direction X, guides the movement of the reading carriage 51 in the main scanning direction X, and is shaped so as to protrude, is erected in a base portion of the reading unit case 15. The guide rail 66 interlocks with the interlocking recess portion 63a of the slider 63 and supports the reading carriage 51 from below. Note that the pinion 61 is disposed in a position in the transport direction Y that is between the rack portion 62 and the guide rail 66. Furthermore, the guide rail 66 is disposed so as to be aligned with the rack portion 62 in the lengthwise direction (the transport direction Y).

As indicated in the partly enlarged section of FIG. 3, a plane-shaped tip portion TP, a first support surface 66a, and a second support surface 66b are formed in the guide rail 66. While the first support surface 66a extends downward in the lengthwise direction (the transport direction Y) from the tip portion TP toward the front, which is toward the rack portion 62, the second support surface 66b extends downward in the lengthwise direction from the tip portion TP toward the rear, which is away from the rack portion 62. The first support surface 66a and the second support surface 66b are configured as curved surfaces that have the same curvature factor.

A first sliding surface 64a that interlocks with the first support surface 66a of the guide rail 66 and a second sliding surface 64b that interlocks with the second support surface 66b of the guide rail 66 are formed in the interlocking recess portion 63a of the slider 63, so as to be arranged in the lengthwise direction (the transport direction Y). Specifically, the ribs 64, which form pairs in the lengthwise direction (the transport direction Y), are provided in the slider 63 so as to oppose each other with the guide rail 66 therebetween. The first sliding surface 64a and the second sliding surface 64b are formed in the ribs 64 that form pairs.

The first sliding surface 64a of the slider 63 has a greater angle of slope, which corresponds to the rising angle from the horizontal plane, than that of the second sliding surface 64b. The "horizontal plane" mentioned here refers to the horizontal plane of the end area of the slider 63 on the guide rail 66 side. The "angle of slope" mentioned here refers to the angle of slope of the inner angle between the horizontal plane and the sliding surface. When the rising angle of the first sliding surface 64a from the horizontal plane is taken as $\alpha 1$ and the rising angle of the second sliding surface 64b from the horizontal plane is taken as $\alpha 2$, $\alpha 1 > \alpha 2$. When the guide rail 66 and the interlocking recess portion 63a of the slider 63 are in an interlocking state, the first sliding surface 64a makes contact with the first support surface 66a at a position C1, which is lower than a position C2 at which the second sliding surface 64b makes contact with the second support surface 66b. Here, the height of the position of contact is referred to as the "height from the horizontal plane", taking the end of the slider 63 on the guide rail 66 side as the horizontal plane. The "lower position" is a position that is below the guide rail 66.

When the motor 52 is driven in a state in which the pinion 61 is engaged with the rack portion 62, the pinion 61 rotates while making contact with the rack portion 62, and the reading carriage 51 moves in the main scanning direction X while being guided by the guide rail 66. At this time, a momentum central to the point of engagement between the pinion 61 and the rack portion 62 is generated in the reading carriage 51. For example, in FIG. 4, in the case where the pinion 61 rotates in the counterclockwise direction and the reading carriage 51 moves to the left, a momentum that attempts to rotate the reading carriage 51 in the counterclockwise direction is generated. Accordingly, a force that causes the ribs 64 to ride up onto the guide rail 66, as indicated by the arrow in FIG. 4, works particularly toward the right end of the slider 63, but the angle of slope $\alpha 1$ of the first sliding surface 64a is set to an angle at which this riding up can be suppressed. In other words, the angle of slope $\alpha 1$ of the first sliding surface 64a is set to be greater than in a case in which the riding up of the slider 63 on to the guide rail 66 is not taken into consideration.

However, if the angles of slope of the first sliding surface 64a and the second sliding surface 64b are too great, the engagement between the guide rail 66 and the interlocking recess portion 63a will become too deep, resulting in a higher sliding load. Accordingly, the angle of slope $\alpha 2$ of the second sliding surface 64b is set to be less than in the case in which the riding up of the slider 63 on to the guide rail 66 is not taken into consideration. In other words, when the angle of slope of the first sliding surface 64a and the second sliding surface 64b in the case where the riding up of the slider 63 of the guide rail 66 is not taken into consideration is taken as $\alpha 3$, $\alpha 1 > \alpha 3 > \alpha 2$.

As shown in FIG. 4, a cable recess portion 67 for extending the housing space for the flexible cable 57 downward is formed in the base of the reading unit case 15, in a position that corresponds to that of the connection portion 58 in the transport direction Y. Note that after the flexible cable 57 has been extended from the left side toward the right side, the end thereof is bent back toward the left in the vicinity of the right end of the cable recess portion 67 and is connected to the connection portion 58 of the reading carriage 51. Accordingly, the housing space formed by the cable recess portion 67 expands downward as the cable recess portion 67 proceeds to the right, in correspondence with the flex displacement of the flexible cable 57, with the base portion of an extension portion 67a growing deeper as the base portion progresses toward the right. Furthermore, the flexible cable 57 is arranged along the pivot shaft 25 that connects the recording unit case 14 to the reading unit case 15 at the rear surface side thereof, and thus the cable recess portion 67 is disposed on the upstream side of the recording carriage 34 in the transport direction Y.

In addition, a driving power source recess portion 68 for extending the movement space of the motor 52 in the downward direction is formed in the base portion of the reading unit case 15 along the main scanning direction X, in a position that corresponds with that of the support portion 59 in the transport direction Y. As shown in FIG. 3, in the image reading unit 13, although the motor 52 requires a large housing space particularly in the vertical direction, in the recording unit 12, the recording carriage 34 requires a large housing space particularly in the vertical direction as well. Accordingly, the motor 52 of the image reading unit 13 is disposed in a forward position distanced from above and below the recording carriage 34, and is disposed so as to overlap with the recording carriage 34 in the vertical direction.

In other words, the housing space of the motor 52 and a housing space of the recording carriage 34 overlap in the vertical direction. Furthermore, the position of the lower end of the motor 52 is located lower than the position of the upper end of the recording carriage 34. A recess portion 69 is formed in the ceiling portion 37 of the recording unit case 14 in a position below the driving power source recess portion 68, in order to prevent interference with the driving power source recess portion 68.

Note that because the feed mechanism 41 is disposed upstream from the recording carriage 34 in the transport direction Y, the driving power source recess portion 68 and the recess portion 69 are disposed downstream from the recording carriage 34 within the recording unit case 14 with a comparatively large amount of excess space. In other words, the motor 52 of the image reading unit 13 is disposed downstream from the recording carriage 34 in the transport direction Y.

Furthermore, if the guide rail 66 is disposed below the motor 52, the height of the image reading unit 13 will be increased, and thus the guide rail 66 is disposed between the motor 52 and the recording carriage 34 in the transport direction Y. In addition, the cable recess portion 67 is disposed in a position in the transport direction Y that is distanced from the driving power source recess portion 68 and the recording carriage 34. Specifically, the cable recess portion 67 is disposed upstream from the recording carriage 34 in the transport direction Y, in order to reduce the length over which the flexible cable 57 is pulled (see FIG. 3). In other words, in the complex machine 11, the positions in which the various constituent elements are disposed are adjusted in order to suppress the height in the case where the recording unit 12 and the image reading unit 13 are arranged vertically.

According to the embodiment described thus far, the following effects can be achieved.

1. Because the interlocking recess portion 63a provided in the reading carriage 51 interlocks with the guide rail 66, tilting of the reading carriage 51 at both ends thereof in the lengthwise direction can be suppressed. In addition, because the first sliding surface 64a that interlocks with the first support surface 66a of the guide rail 66 has a greater angle of slope than the second sliding surface 64b, it is possible to suppress the interlocking recess portion 63a of the reading carriage 51 from riding up on the guide rail 66. Accordingly, tilting of the reading carriage 51 at both ends thereof in the lengthwise direction when the reading carriage 51 is moving can be suppressed, and it is thus possible to suppress tilting of the reading sensor 50 that is supported by the reading carriage 51.

2. Because the first support surface 66a and the second support surface 66b are configured of curved surfaces that have the same curvature factor, the first sliding surface 64a and the second sliding surface 64b can be guided without any looseness even in the case where the angle of interlocking between the guide rail 66 and the interlocking recess portion 63a has become shifted. In addition, the first sliding surface 64a makes contact with the first support surface 66a at the position C1, which is lower than the position C2 at which the second sliding surface 64b makes contact with the second support surface 66b, and thus the interlocking recess portion 63a of the reading carriage 51 can be suppressed from riding up onto the guide rail 66.

3. The sliding load between the interlocking recess portion 63a and the guide rail 66 can be suppressed by the first sliding surface 64a and the second sliding surface 64b, in which the pairs of ribs 64 are formed, interlocking with the guide rail 66. Furthermore, because a plurality of groups of the pairs of ribs 64 are provided in the main scanning direction X, the guide rail 66 can support the reading carriage 51 through the interlocking recess portion 63a in a well-balanced manner.

4. The interlocking recess portion 63a of the reading carriage 51 can be suppressed from riding up onto the guide rail 66 by the first sliding surface 64a, whose angle of slope α1 is greater than α3 (the angle of slope in the case where the riding up of the guide rail 66 is not taken into consideration), even in the case where the pinion 61 rotates while engaging with the rack portion 62.

5. Although a momentum acting in the direction in which the first sliding surface 64a rides up on the first support surface 66a is generated when the pinion 61 rotates, the interlocking recess portion 63a of the reading carriage 51 can be suppressed from riding up onto the guide rail 66 by the first sliding surface 64a, whose angle of slope α1 is greater than α3 (the angle of slope in the case where the riding up of the guide rail 66 is not taken into consideration).

Note that the aforementioned embodiment may be modified as described hereinafter.

The motor 52 need not be mounted in the reading carriage 51. For example, the reading carriage 51 may be attached to an endless belt stretched across a driving pulley and a slave pulley provided at the respective ends of the reading unit case 15 in the main scanning direction X, and the reading carriage 51 may then be moved by rotating the driving pulley using a motor supported by the reading unit case 15.

The tip portion TP of the guide rail 66 may be a half-circle shape when viewed cross-sectionally, rather than a plane shape.

The angle of slope α2 of the second sliding surface 64b may be equal to the angle of slope α3 used in the case where the riding up onto the guide rail 66 is not taken into consideration.

Rather than providing the ribs 64 in the slider 63, the interlocking recess portion 63a may interlock with the guide rail 66 directly.

The image reading unit 13 may be disposed below the recording unit 12.

The image reading unit 13 may be a barcode reader, and optical character reader, or the like. Furthermore, the reading sensor 50 is not limited to a CIS (contact image sensor), and instead may employ another reading technique, such as using a CCD (charge coupled device).

The complex machine 11 is not limited to a printer provided with a scanner function, and may instead be a fax machine, a copy machine, or the like that does not include the document cover 22.

The image reading unit 13 may be an image reading apparatus that does not include the recording unit 12.

The entire disclosure of Japanese Patent Application No.2010-228181, filed Oct. 8, 2010 is expressly incorporated by reference herein.

What is claimed is:

1. An image reading apparatus comprising:
a reading sensor for reading an image;
a reading carriage that supports the reading sensor;
a driving portion that moves the reading carriage;
a guide portion that is linked to the driving portion and that extends so as to guide the movement of the reading carriage;
a guide rail, extending parallel to the guide portion, that guides the reading carriage while supporting the reading carriage; and
an interlocking portion, provided in the reading carriage, having a first sliding surface that makes contact with the guide rail on the side of the guide rail facing the guide portion and a second sliding surface that makes contact with the guide rail on the side of the guide rail that is on the opposite side as the guide portion,
wherein the position at which the first sliding surface of the interlocking portion makes contact with the guide rail is lower on the guide rail than the position at which the second sliding surface of the interlocking portion makes contact with the guide rail.

2. The image reading apparatus according to claim 1, wherein the interlocking portion is configured of a plurality of ribs opposing each other with the guide rail between the opposing ribs; and the first sliding surface and the second sliding surface are formed in the respective ribs that form a pair.

3. The image reading apparatus according to claim 1, wherein the guide portion is a rack portion; and the driving portion is a pinion that rotates in accordance with the driving of a driving power source provided in the reading carriage and engages with the rack portion.

4. The image reading apparatus according to claim 3, wherein the pinion is disposed in a position that is between the guide portion and the guide rail.

5. An image reading apparatus comprising:
a reading sensor for reading an image;
a reading carriage that supports the reading sensor;
a driving portion that moves the reading carriage;
a guide portion that is linked to the driving portion and that extends so as to guide the movement of the reading carriage;
a guide rail, extending parallel to the guide portion, that guides the reading carriage while supporting the reading carriage; and
an interlocking portion, provided in the reading carriage, having a first sliding surface that makes contact with the guide rail on the side of the guide rail facing the guide portion and a second sliding surface that makes contact with the guide rail on the side of the guide rail that is on the opposite side as the guide portion,
wherein a rising angle that forms an inner angle from the horizontal plane of the first sliding surface of the interlocking portion has a greater angle of slope than a rising angle that forms an inner angle from the horizontal plane of the second sliding surface of the interlocking portion.

* * * * *